United States Patent [19]

Orr

[11] 3,917,013
[45] Nov. 4, 1975

[54] SINGLE PEDAL BRAKING SYSTEM FOR CRAWLER TRACTOR

[75] Inventor: Bobby J. Orr, Springfield, Ill.

[73] Assignee: Fiat-Allis Construction Machinery, Inc., Deerfield, Ill.

[22] Filed: Oct. 21, 1974

[21] Appl. No.: 516,287

[52] U.S. Cl. ................ 180/6.7; 192/4 A; 192/13 R
[51] Int. Cl.² ........................................ B62D 11/08
[58] Field of Search ................... 180/6.7, 6.2, 6.44; 192/13 R, 4 A

[56] References Cited
UNITED STATES PATENTS

| | | | |
|---|---|---|---|
| 3,324,963 | 6/1967 | Stroot et al. | 180/6.2 |
| 3,358,786 | 12/1967 | Hultgren | 180/6.7 |

*Primary Examiner*—Leo Friaglia
*Assistant Examiner*—John A. Pekar

[57] ABSTRACT

A hydraulic control system for steering and braking a crawler tractor having a pair of crawler tracks comprises a pair of brakes, a pair of brake power boost cylinders for operating the brakes, a pair of steering clutches and a pair of manually operated steering clutch control valves. The system also comprises a single brake pedal connected through an equalizer mechanism to actuate both brake power boost cylinder control spools simultaneously. The system further comprises a shuttle valve responsive to the condition of the steering clutches to supply hydraulic operating fluid to both brake boost cylinders during straight line tractor operation when both tracks are moving and the single brake pedal is depressed but to supply fluid to only one brake boost cylinder during a steering operation when only one track is moving and the brake pedal is depressed.

6 Claims, 2 Drawing Figures

SINGLE PEDAL BRAKING SYSTEM FOR CRAWLER TRACTOR

BACKGROUND OF THE INVENTION

1. Field of Use

This invention relates generally to hydraulic control systems for steering and braking vehicles such as crawler tractors which have crawler tracks on opposite lateral sides thereof. In particular, the invention relates to such a system wherein a single brake pedal is used to control either or both of the vehicle tracks, depending on the condition of the steering clutches.

2. Description of the Prior Art

Some prior art crawler tractors having tracks on opposite lateral sides thereof employ a hydraulic control system for steering and braking wherein a pair of manually operated steering clutch levers are used to selectively actuate a pair of steering clutch valves which, in turn, control a pair of steering clutches which transmit motive power to the tracks. A pair of brake pedals are used to selectively actuate a pair of brake power boost cylinders which, in turn, control a pair of brakes for the tracks. Straight line vehicle movement is accomplished by driving both tracks in the same direction at the same speed. Steering is accomplished by using one steering lever so as to slow down, or stop one track while continuing to drive the other. Braking is accomplished during straight line vehicle movement by using both brake pedals and during steering by using the appropriate one of the brake pedals, i.e., the brake pedal for the track which is to be slowed or stopped.

In such prior art crawler tractors, the need to operate two separate brake pedals makes operation more demanding and fatiguing for the operator and introduces a safety hazard in view of the chance of the operator hitting the wrong brake. Furthermore, duplicate brake pedals and brake linkages add to the complexity of the machine and to the cost of manufacturing and servicing.

SUMMARY OF THE INVENTION

In accordance with the invention there is provided a vehicle such as a crawler tractor having left and right crawler tracks on opposite lateral sides thereof and engine-driven transmission for supplying motive power to the tracks. The tractor is provided with a hydraulic steering and braking system which includes left and right manually actuatable steering levers and a single foot actuated brake pedal. The left and right steering levers are connected to operate left and right steering clutch control valves which, in turn, are connected to operate left and right steering clutches through which motive power is applied from the transmission to the left and right tracks. Each steering lever, when actuated (i.e., pulled) opens its associated steering clutch control valve to effect fluid flow from a source of hydraulic fluid, such as a hydraulic pump, to its associated clutch to effect release of the clutch (i.e., disengagement of the transmission from that track). The aforementioned single foot actuated brake pedal is connected through an equalizer mechanism to simultaneously operate the valve spools of both left and right brake power boost cylinders which, in turn, are connected to operate left and right brakes which, when applied, stop or retard motion of their respective tracks. More specifically, each brake power boost cylinder comprises a control piston which, when its associated valve spool is actuated (i.e., depressed), normally responds to fluid supplied to the cylinder to effect hydraulic application of a spring-released brake.

The system also includes a pilot fluid operated shuttle valve having a valve spool operable in opposite directions and responsive to pilot fluid flow from the fluid line supplying the released clutch to direct fluid from the engaged steering clutch control valve to that brake power boost cylinder of the track which is to be stopped when the brake pedal is depressed. During straight line tractor movement, the shuttle valve allows fluid to flow to both brake power boost cylinders to that actuation of the single brake pedal effects operation of both brakes. During a steering movement, actuation of a steering clutch lever actuates the appropriate steering clutch valve which, in turn, effects release of the appropriate clutch and also effects operation of the shuttle valve in the appropriate direction to allow fluid to flow to only one brake power boost cylinder so that subsequent actuation of the single brake pedal effects operation of only one brake, i.e., that brake for the track whose clutch has been disengaged.

A brake system in accordance with the invention requires only one pedal for operating the brakes instead of two pedals as are used on most prior art tractors. Thus, the brake system enables easier operation of the tractor, offers improved safety, since there is no chance of hitting the wrong brake, and eliminates redundant mechanical linkage required for two brake pedals.

Through the use of an equalizer mechanism in the brake pedal linkage and a shuttle valve in the hydraulic power steering and brake circuit, one brake pedal can be used to perform all the functions which heretofore required two brake pedals.

The equalizer mechanism which connects the one brake pedal to both brake power boost cylinder spools allows for equal mechanical force distribution to each brake.

Control of power boost to the brake cylinders is accomplished by the shuttle valve which is effective only during steering. During straight ahead operation the valve is centered in neutral and in no way alters the flow of oil to the power brake cylinders, thus enabling both brakes to be applied when the single pedal is depressed.

Other advantages of the invention will hereinafter appear.

DRAWING

In the single sheet of drawings,

FIG. 1 is a schematic diagram of a combined hydraulic brake and steering system for a vehicle in accordance with the invention and depicts components, including two brake actuators, positioned to effect a right turn movement of the vehicle; and FIG. 2 shows one of the brake actuators of FIG. 1 in another of its operating positions.

DESCRIPTION OF A PREFERRED EMBODIMENT

Figures 1, 2:
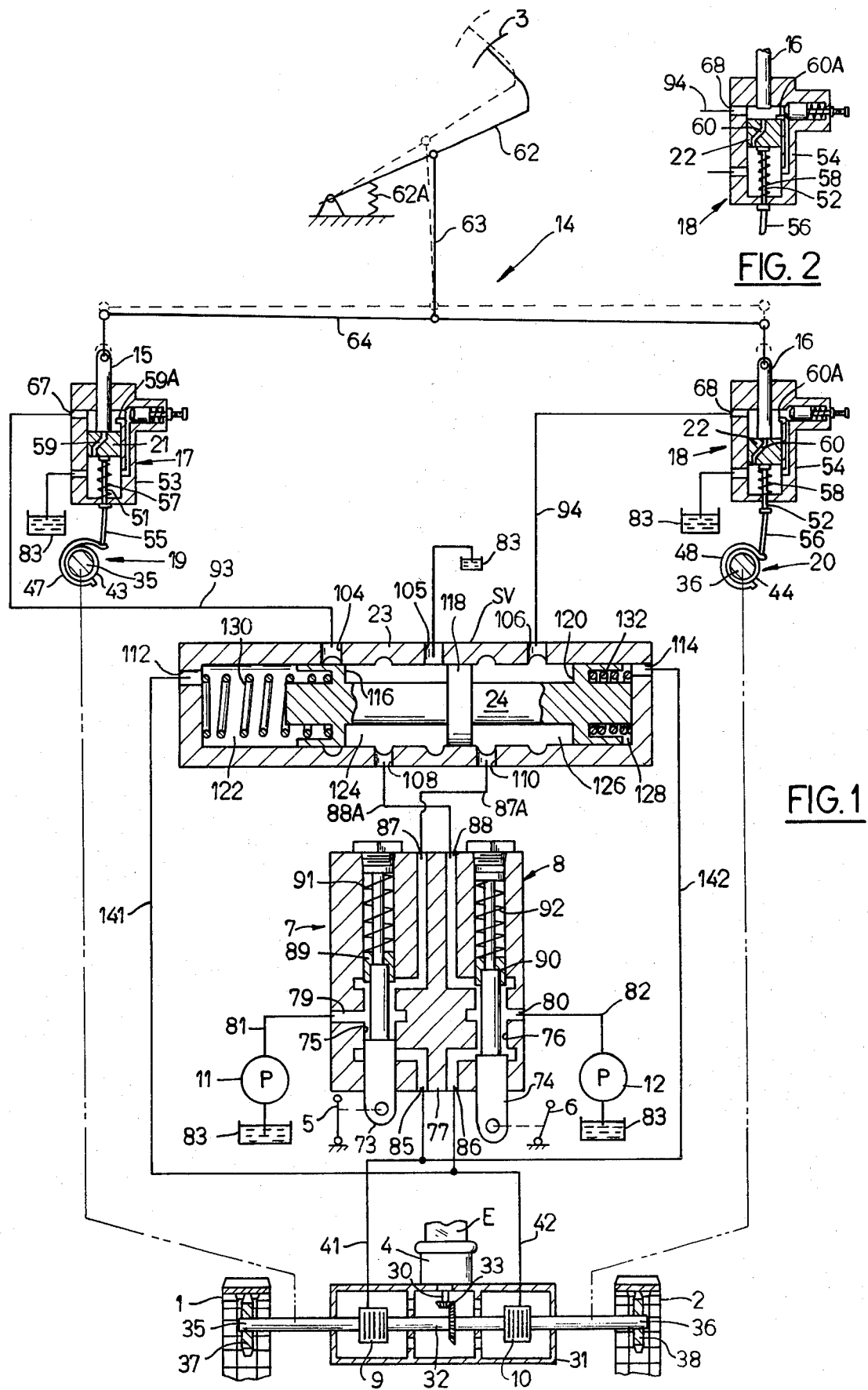

Referring to FIG. 1, there is provided a vehicle such as a crawler tractor having left and right crawler tracks 1, 2 on opposite lateral sides thereof, an engine E, an engine-driven transmission 4 for supplying motive power to the tracks through selectively operable clutches 9, 10 and brakes 19, 20 for the tracks 1, 2.

Transmission 4 is a power shift transmission for driving the tractor and has an output shaft 30 which extends into a housing 31 to drive a main shaft 32 through bevel gears 33. Main shaft 32 is connectable through the clutches 9, 10 when the latter are engaged to drive the left and right final drive shafts 35, 36 to which track drive sprockets 37, 38 for the tracks 1, 2 are affixed. The clutches 9, 10 are of a conventional hydraulically operated type and are normally engaged but disengage when hydraulic fluid is supplied thereto through the fluid supply lines 41, 42. The left and right drive shafts 35, 36 are provided with brake drums 43, 44 which are part of the brakes 19, 20. The brakes 19, 20 are conventional hydraulically applied, spring-released brakes and further comprise left and right brake bands 47, 48.

The tractor is provided with a hydraulic steering and braking system which includes left and right manually actuatable steering levers 5, 6 for operating steering clutch control valves 7 and 8 for the clutches 9, 10; a single foot-actuated brake pedal 3 for operating brake actuators 17 and 18 for the brakes 19, 20; and a shuttle valve SV having a movable spool 24.

The left and right steering levers 5, 6 are connected to operate the valve spools 73, 74 of the left and right steering clutch control valves 7, 8 which, in turn, are connected to operate the left and right steering clutches 9, 10 through which motive power is applied from the transmission 4 to the left and right tracks 1, 2. Each steering lever 5, 6, when actuated (i.e., pulled) operates a valve spool 73, 74 of the associated steering clutch control valve 7, 8 to effect fluid flow from a source of hydraulic fluid, such as the engine-driven hydraulic pumps 11, 12 to its associated clutch 9, 10 to effect release (disengagement) of the clutch so as to disengage the transmission 4 from the track 1, 2. The valve spools 73, 74 are reciprocably disposed within bores 75, 76 of a valve housing 77 which is common to the two control valves 7, 8 and connected to the main frame of the tractor by means not shown. The pump units 11 and 12 are connected to supply ports 79, 80 of the valves 7, 8 by supply lines 81, 82 and have their intake conduits connected to reservoirs 83. The control valves 7, 8 also include clutch supply ports 85, 86 connected to the clutches 9, 10 by lines 41, 42 and shuttle valve supply ports 87, 88 connected to the ports 110, 108, respectively, of shuttle valve SV by supply lines 87A, 88A, respectively. The control valves 7, 8 additionally include clutch pressure control valves in the form of shiftable sleeves 89, 90 biased by coil springs 91, 92 carried on the valve spools 73, 74. The valve spools 73, 74 of the control valves 7, 8 are shiftable from a clutch engaged position, in which 73 is illustrated, to a clutch disengaged position, in which 74 is illustrated. It will be noted that valve spool 74 when shifted downwardly as shown connects supply port 80 to clutch port 86 to operate (release or disengage) clutch 10. When clutch operating pressure is reached, the clutch pressure control sleeve 90 is forced upward against spring 92 thereby permitting fluid from supply port 80 to also flow to brake port 88. Pilot pressure lines 141, 142 are connected between the fluid supply lines 42, 41 of the clutches 10, 9 and the pilot fluid ports 112, 114 of shuttle valve SV.

When a steering spool 73 or 74 is in neutral position, in which valve 7 is shown, its shiftable sleeve (89 or 90) is held in a partially open position so that fluid from its pump can flow freely to either the dump port 105 of shuttle valve SV or to the appropriate brake valve, depending on the position of the shuttle valve spool 24. When a steering valve spool 73 or 74 is moved in the direction shown for valve spool 74, its shiftable sleeve (89 or 90) tends to partially close the fluid passage between the supply port (79 or 80) and the shuttle valve supply port (87 or 88). This pressurizes fluid at its clutch supply port (85 or 86) in proportion to the amount the steering lever (5 or 6) is moved thereby permitting the operator to modulate clutch disengagement.

The fluid lines 87A and 88A are cross connected between the steering valve housing 77 and the shuttle valve SV. More specifically, port 87 of steering valve 7 is connected to port 110 of shuttle valve SV by line 87A and port 88 of steering valve 8 is connected to port 108 of shuttle valve SV by line 88A. The purpose of the cross connection is as follows. When steering control is applied, such as when one clutch is disengaged and one brake is engaged, fluid from both pumps 11 and 12 will be utilized rather than fluid from only one, with one supplying the clutch and the other supplying the brake. This is advantageous because both the steering valves and the brake valves disclosed are capable of modulation. In a non-cross connected system, if a higher fluid pressure is applied to the brake than was originally applied to the clutch, it would cause clutch release and conflict with the operator-applied modulated control of the clutch.

The brake pedal 3 is disposed on a pivotally mounted brake pedal lever 62 which is normally biased upwardly to a brake-release position by means of a biasing spring 62A. Lever 62 is connected through an equalizer mechanism 14, including a brake pedal linkage 63 and an equalizer bar 64, to simultaneously operate the axially movable valve spools 15 and 16 of the left and right hydraulically operated brake power boost cylinders or brake actuators 17 and 18, respectively. The actuators 17 and 18 are connected to operate the left and right hydraulically-applied spring-released brakes 19 and 20, respectively, which when applied, stop or retard motion of their respective tracks 1, 2. The equalizer bar 64 is pivotally connected at its ends to the valve spools 15 and 16 and it is pivotally connected at its midpoint to the brake pedal linkage 63. The brake actuators 17, 18 comprise control pistons 21, 22, respectively which respond to fluid supplied to the actuator pressure ports 67, 68, respectively, to effect hydraulic application of the brakes 19 and 20, respectively, as hereinafter explained.

The brake actuators 17, 18 have piston rods 51, 52 extending from the ends of the cylinder housings 53, 54 and connected to the brake bands 47, 48 by links 55, 56. The housings 53, 54 have pressure ports 67, 68 connected to ports 104, 106 on a shuttle valve SV hereinafter described. The housings 53, 54 are secured to the main frame of the tractor by means not shown. The brake bands 47, 48 are adapted to engage the brake drums 43, 44 to exert a braking action when the piston rods 51, 52 are moved outwardly of the housings 53, 54 by fluid acting on the control pistons 21, 22. Large coil springs 57, 58 within the cylinder housings 53, 54 effect release of the brakes when fluid flow on the control pistons 21, 22 is cut off. The axially shiftable valve spools 15, 16 are reciprocably mounted in alignment with bores 59, 60 in the pistons 21, 22.

When brake pedal 3 is not being depressed it is biased upwardly by a spring 62A. Consequently, the valve spools 15, 16 and the control pistons 21, 22 assume the upwardly disposed positions shown in FIG. 2. Upward travel of the pistons 21, 22 is limited by shoulders 59A, 60A formed in the housings. Consequently, fluid from ports 67, 68 is able to flow through the bores 59, 60 in the pistons 21, 22 without effecting piston movement. However, when the valve spools 15, 16 are depressed by pedal 3, as shown in FIG. 1, the bores 59, 60 are blocked and the pistons assume the position in which piston 21 is shown in FIG. 1. If there is fluid flow to port 67, 68, the fluid pressure on the piston causes downward movement of the pistons 21, 22 to the position in which piston 22 is shown in FIG. 1 thereby causing brakes 19, 20 to be applied.

Referring to FIG. 1, when the brake pedal 3 is depressed, as shown in FIG. 1, the equalizer bar 64 causes the valve spools 15 and 16 to be depressed to a position wherein they block off the fluid passages 59 and 60, respectively. Since no fluid is being supplied to port 67 of brake actuator 17, closure of the passage 59 by spool 15 has no effect, and the valve spool 15 merely forces the piston 21 part way down to a position, such as shown in FIG. 1, wherein brake 19 is not applied. However, since fluid is being supplied to port 68 of actuator 18, downward movement of valve spool 16 and consequent closures of passage 60 in piston 62 causes piston 62 to be depressed hydraulically to a position such as is shown in FIG. 1 wherein application of brake 20 is effected. It will be noted that, since fluid actuated piston 22 of actuator 18 is depressed further than piston 21 of actuator 17, the associated spools 15 and 16, respectively, travel downwardly different distances. Such differential downward travel of the spools 15 and 16 is possible because the equalizer bar 64 is pivotally connected to the valve spools 15 and 16 and also to the linkage 63.

The pilot fluid operated shuttle valve SV has a cylinder or housing 23 and a shuttle valve spool 24 therein which is axially movable in opposite directions from a centered position. Spool 24 is responsive to pilot fluid flow in lines 142, 141 connected to the fluid line 41, 42 supplying an actuated (released) steering clutch 9, 10 to direct fluid from the actuated control valve 7, 8 to the brake actuator 17, 18 for the track 1, 2 which is no longer propelled and is to be slowed or stopped when the brake pedal 3 is depressed. During straight line tractor movement, shuttle valve spool 24 is centered and allows fluid to flow from both control valves 7, 8 to both brake actuators 17, 18 so that operation of brake pedal 3 effects operation of both brakes 19, 20. During steering movement of the tractor, shuttle valve spool 24 moves left or right, depending on which clutch 9, 10 is disengaged, and allows fluid flow to only one brake actuator 17, 18 so that subsequent operation of brake pedal 3 effects operation of only one brake 19, 20, i.e., the brake for the track which is no longer being driven.

Spool 24 is provided with three lands 116, 118 and 120 which cooperate with housing 23 to define a right steering clutch pilot pressure chamber 122 having a pilot fluid port 112; a left brake fluid supply chamber 124 having an inlet port 108 and an outlet port 104; a right brake fluid supply chamber 126 having an inlet port 110 and an outlet port 106; and a left steering clutch pilot pressure chamber 128 having a pilot fluid port 114. The housing 23 of shuttle valve SV is provided with a dump port 105 connected to reservoir 83 to prevent blockage of pump flow for the pump not supplying fluid to a brake valve when the shuttle valve spool 24 is shifted one way or the other. When the shuttle valve spool 24 is centered, the port 105 is blocked by land 118 so that the fluid from both pumps 11 and 12 may be pressurized upon application of a brake or brakes. Centering springs 130 and 132 are disposed in the chambers 122 and 128 between the ends of the housing 23 and the outermost lands in the spool 24 to center the latter when pilot pressure in chambers 122 and 128 is equalized. A pair of fluid lines 93, 94 connect the left and right brake actuator supply ports 67, 68 to the outlet ports 104 and 106 of shuttle valve SV.

When shuttle valve spool 24 is centered (i.e., when pilot pressure in chambers 122, 128 is equal), fluid can flow from ports 87, 88 of control valves 7, 8 in ports 108, 110 through the chambers 124, 126 and out ports 104, 106 to the supply ports 67, 68 of both brake actuators 17, 18. When shuttle valve spool 24 is moved to the right or left by increased pilot pressure in chamber 122 or 128, respectively, (caused by pilot pressure flow in the line 141 or 142, respectively) fluid flow through chamber 126 or 124, respectively, is possible, but flow through chamber 124 or 126, respectively, to the port 104 or 106, respectively, is blocked. Shuttle valve spool 24 is shown shifted to the right in the drawing to enable fluid flow to brake actuator 18.

Steering of the tractor is accomplished as follows. For purposes of discussion, assume a right turn condition, and that system components are in the condition shown in the drawing. One of the steering clutch levers 6 is pulled to release the clutch 10. When the right steering clutch lever 6 is pulled, fluid from the steering valve 8 flows to the steering clutch release mechanism thereby releasing the clutch 10. As this occurs a small pilot flow from the fluid line 42 to clutch 10 is directed by pilot fluid line 141 to the left end pilot pressure chamber 122 of shuttle valve SV causing the shuttle valve spool 24 to move to the right, as shown in the drawing. This blocks the flow of oil to the left brake actuator 17, but does not interfere with the flow of oil to the right brake actuator 18. The operator then depresses the brake pedal 3 which actuates (depresses) both control spools 15, 16 of the brake actuators 17, 18. However, since there is oil available for power assist to the right brake actuator 18 only, the left brake 19 merely drags and the right brake 20 is applied in the normal manner. There is some power loss in the left brake 19 due to the drag, however this drag is in the range of 2% (two percent) or less under almost all steering conditions and is therefore considered insignificant.

Steering to the left is just the opposite of the right steer condition described above.

During straight ahead operation the spool 24 of the shuttle valve SV remains centered allowing oil to flow to both brake actuators 17, 18. Therefore, when the pedal 3 is depressed both actuators 17, 18 are actuated by power simultaneously and equally. Also, when both steering clutches 9, 10 are disengaged at the same time, the valve spool 24 remains centered allowing both brakes 19, 20 to perform normally.

I claim:

1. In a crawler tractor having an engine-driven transmission and a pair of tracks, a control system for steering and braking said tractor comprising: a pair of selectively operable clutches for connecting said tracks to said transmission, a pair of selectively operable clutch control valves for said pair of clutches, a pair of brakes for said tracks, a pair of hydraulic brake actuators for said pair of brakes, each brake actuator having a control element movable to operate its respective brake if fluid is being supplied to its respective actuator, a single brake pedal mechanically connected to each said control element for simultaneously operating the control elements of both of said brake actuators, a source of fluid connected to said clutch control valves, and a fluid operated shuttle valve connected between said clutch control valves and said brake actuators for controlling fluid flow from said source to said brake actuators in response to fluid flow conditions between said clutch control valves and said clutches indicative of the condition of said clutches, said shuttle valve being operable to direct fluid to both brake actuators when both clutches are operated together whereby actuation of said single brake pedal operates both brakes, said shuttle valve being further operable to direct fluid to only one brake actuator when only one clutch is operated whereby actuation of said single brake pedal operates only one brake.

2. A crawler tractor according to claim 1 wherein said one brake is the brake for that track whose clutch is disengaged.

3. A crawler tractor according to claim 1 wherein said shuttle valve comprises a shiftable control element having one position wherein it enables fluid to be directed to both brake actuators and having other positions wherein it enables fluid to be directed to only one brake actuator.

4. In a crawler tractor having an engine-driven transmission and a pair of tracks, a control system for steering and braking said tractor comprising: a source of fluid, a pair of hydraulic clutches for connecting said tracks to said transmission, a pair of selectively operable clutch control valves for said pair of clutches, each clutch control valve being operable to direct fluid from said source to its respective clutch, each clutch control valve having a control element movable to operate its respective clutch, a pair of brakes for said tracks, a pair of hydraulic brake actuators for said pair of brakes, each brake actuator having a control element movable to operate its respective brake if fluid is being supplied to its respective actuator, a single brake pedal mechanically connected to each said control element for simultaneously operating the control elements of both of said brake actuators, and a fluid operated shuttle valve connected between said clutch control valves and said brake actuators for controlling fluid flow from said source to said brake actuators in response to the condition of said clutches, said shuttle valve comprising a control element movable in response to fluid flow between said clutch control valves and said clutches and having one position wherein it directs fluid from said source to both brake actuators when both clutches are engaged or disengaged whereby actuation of said single brake pedal operates both brakes, said shuttle valve control element being movable to another position wherein it enables fluid to be supplied to only one brake actuator in response to operation of one clutch whereby actuation of said single brake pedal operates only one brake.

5. A crawler tractor according to claim 4 wherein said one brake is the brake for that track whose clutch is disengaged.

6. In a vehicle having an engine-driven transmission and right and left final drive shafts, a control system for steering and braking said vehicle comprising: a source of fluid, right and left selectively operable hydraulically controlled steering clutches for connecting said right and left final drive shafts, respectively, to said transmission, right and left steering clutch control valves for operating said right and left steering clutches, each steering clutch control valve having a control element shiftable between clutch engaged and clutch disengaged positions, each steering clutch control valve having a supply fluid port connected to said source, a clutch port connected to its respective clutch and a brake fluid port, right and left brakes operatively associated with said right and left shafts, respectively, right and left fluid operated brake actuators connected to said right and left brakes, respectively, and operable to apply its respective brake, each brake actuator having a pressure port and a control element shiftable between brake released and brake applied positions, each brake control element effecting brake application when moved to brake applied position when said pressure port is supplied with fluid, a single brake pedal, means for connecting said single brake pedal to both control elements of said brake actuator to operate both of them simultaneously, a shuttle valve responsive to the condition of said steering clutches and having a pilot pressure operated control element shiftable between a neutral position, a right brake position and a left brake position, said shuttle valve having a pair of brake actuator ports connected to said pressure ports of said brake actuators, a pair of clutch valve ports connected to said brake fluid ports of said clutch valves and a pair of pilot pressure ports connected to said clutch ports of said control valves, said shuttle valve being operable when both of said clutch fluid ports of said control valves are supplying fluid or not supplying fluid to cause the shuttle valve control element to assume its neutral position and allow fluid flow from said brake valve ports of said control valves through said shuttle valve to said pressure ports of both of said brake actuators so that actuation of said single brake pedal effects application of both brakes, said shuttle valve being further operable in response to fluid being supplied to either one of said clutch fluid ports of said clutch valves to cause said shuttle valve control element to assume one of its other positions and allow fluid flow from said brake valve port of only one clutch valve through said shuttle valve to the pressure port of only one brake actuator so that actuation of said single brake pedal effects application of only one brake.

* * * * *